United States Patent [19]

Greenbergerl Alan J. et al.

[11] Patent Number: 5,355,369

[45] Date of Patent: Oct. 11, 1994

[54] HIGH-SPEED INTEGRATED CIRCUIT TESTING WITH JTAG

[75] Inventors: Greenberger Alan J., South Whitehall Township, Lehigh County; Homayoon Sam, Wescosville, both of Pa.

[73] Assignee: AT&T Bell Laboratories, Murray Hill, N.J.

[21] Appl. No.: 692,337

[22] Filed: Apr. 26, 1991

[51] Int. Cl.$^5$ .............................................. H04B 17/00
[52] U.S. Cl. .................................. 371/22.3; 371/22.1
[58] Field of Search .................... 371/22.3, 22.2, 22.1, 371/15.1, 16.1, 21; 364/481; 395/575 MS File; 324/73.1, 158 R

[56] References Cited

U.S. PATENT DOCUMENTS

| | | | |
|---|---|---|---|
| 4,455,661 | 6/1984 | Qureshi | 364/900 |
| 4,710,927 | 12/1987 | Miller | 371/15 |
| 4,811,345 | 3/1989 | Johnson | 371/16 |
| 4,945,536 | 7/1990 | Hancu | 371/22.3 |
| 5,068,783 | 11/1991 | Tanagawa et al. | 395/575 |

FOREIGN PATENT DOCUMENTS

| | | |
|---|---|---|
| 92303308 | 9/1992 | European Pat. Off. . |
| 2589264 | 4/1987 | France . |
| 2643992 | 9/1990 | France . |

OTHER PUBLICATIONS

Journal of Electronic Testing: Theory and Applications, "In Introduction to the Boundary Scan Standard; ANSI/IDDD Std. 1149.1" by Maunder et al. Mar., 1991, pp. 27–42.

Electronik, Feb. 2, 1989, Messen und Testen, "Verbesserte Prufbarkeit durch strukturierte ASIC-Designs" by Dr. Wolfgang Wach, pp. 31–36, English Abstract of French Patent 2643992.

Motorola Semiconductor Technical Data, DSP96002, by BR575/D, Technical Summary, "96-Bit General Purpose Floating-Point Digital-Signal Processor (DSP)" Motorola, Inc., 1988.

Texas Instruments TMS320C50 DSP Preview Bulletin, p. 4.

Texas Instruments TMS 320 Family Development Support Reference Guide Hardware Development Tools—TMS320 Emulator (XDS), pp. 5-17 to 5-32.

The Test Access Port and Boundary Scan Architecture, Colin M. Maunder and Rodham E. Tulloss, IEEE Computer Society Press Tutorial, 1990 IEEE, pp. 33 through 77.

Publication: Digital Signal Processing: Technology and Applications, Title: TMS320C50-The Next Generation 35NS Fixed-Point Digital Signal Processor, Author: C Marven, Texas Instruments Ltd., Journal Date: Oct. 19, 1989, Page No.: 5.1/1–8.

Primary Examiner—Robert W. Beausoliel, Jr.
Assistant Examiner—Phung My Chung
Attorney, Agent, or Firm—James H. Fox

[57] ABSTRACT

The use of the JTAG port provides for boundary scan testing of integrated circuits, thereby allowing for the testing of IC's after they have been mounted into a circuit board. However, the conventional JTAG scheme is limited as to speed, since both the input and output vectors must be serially shifted in and out of I/O buffers along the chip boundaries. The present invention speeds the testing of high-speed core logic circuitry by transferring the test program to a special test data register, which downloads the program to the logic circuitry under test, and uploads the results. This allows the core logic to perform the test at its normal operating speed, while still retaining compatibility with the JTAG standard for other tests.

23 Claims, 4 Drawing Sheets

HIGH-SPEED INTEGRATED CIRCUIT TESTING WITH JTAG

BACKGROUND OF THE INVENTION

1. Field of the Invention

The present invention relates to an integrated circuit (IC) that implements the JTAG test port while providing for the high-speed testing of a programmable digital processor.

2. Description of the Prior Art

The development of complex integrated circuits increasingly depends upon the ability to test the circuitry sufficiently to ensure proper operation. This is increasingly difficult as the number of logic gates in a given integrated circuit increases. The input test data (referred to as "vectors") must also increase, so that all possible input states, or at least a significant portion of them, are included in the test program. Traditionally, digital processors have been tested for functionality in the factory on a commercial test machine. Either the wafer is probed or the packaged part is tested. A sequence of vectors is applied in parallel to the input pads or pins and comparisons with expected results are performed on output pads or pins. The fault coverage is usually less than 100% and is dependent on how many vectors there are, how well the vectors were written, and the degree of complexity of the circuitry to be tested.

The problems with this prior-art testing scheme include the fact that commercial test sets are having difficulty working fast enough to test very fast parts. The only way to test the packages once they have been soldered into boards is to come down with a custom "bed of nails" that disables other chips on the board and applies vectors to the package under test. This is increasingly difficult as the industry goes to surface mount packages on both sides of a printed circuit board. It is not possible to test the package in the field or even in the factory when the printed circuit board is plugged in to its slot. In an application specific integrated circuit (ASIC) methodology, a core processor can end up embedded in a design such that the standard vector set of tests cannot be applied from the bond pads.

Many have advocated dealing with the test problems by adding Built In Self Test (BIST) circuitry to a chip. Here, a signal applied to the chip causes the BIST circuitry to perform a test. Typically, there is a pseudo-random sequence produced by a shift register with feedback. The sequence is applied to circuitry under test and the outputs from the circuitry are compressed and compared with an expected signature. BIST has been used successfully in a number of chips. The problems with this testing scheme include: While BIST solutions are known for regular structures such as memories, there is no general way known to produce BIST for arbitrary random logic with arbitrarily high fault coverage. Also, there can be a problem with BIST with an error condition aliasing to the same signature as a passing condition. In addition, BIST requires adding area overhead and possibly speed overhead to the chip.

A recent development in integrated circuit testing is the use of the so-called JTAG (i.e., Joint Test Action Group) test port for in situ testing of IC chips mounted on a board. This standard has been adopted by the Institute of Electrical and Electronics Engineers, Inc., and is now defined as the IEEE Standard 1149.1, *IEEE Standard Test Access Port and Boundary-Scan Architecture*, which is incorporated herein by reference. An overview of the development, definition, and application of this standard is provided in *The Test Access Port and Boundary-Scan Architecture*, C. M. Maunder and R. E. Tulloss, published by the IEEE Computer Society Press, Los Alamitos, Calif. (1990). Referring to FIG. 3, in the JTAG scheme, a four (or optionally five) signal Test Access Port (TAP) is added to each chip or grouping of chips on a board. The TAP includes three inputs: a test clock (TCK), a test mode select (TMS), and test data in (TDI). In addition, there is one output, test data output (TDO). TDI and TDO are daisy-chained from chip to chip, whereas TCK and TMS are broadcast.

Every JTAG chip contains a boundary scan register (300), and a bypass register (301). The boundary scan register provides for serially shifting any desired data pattern from the TDI port into the input stages of the chip. The boundary scan register also provides for receiving the output data of each output stage of the chip, and for serially shifting these bits out through the TDO port. Inputs from the chip terminals $I_1 \ldots I_3$, and system clock terminal CKI are provided to the boundary scan register. These may be output from the boundary scan register to the chip circuitry by lines $JI_1 \ldots JI_3$, and JCKI, respectively. (Other lines, not shown, are used to send signals in the other direction, from the chip output circuitry to the chip output terminals.) Each chip also contains a TAP controller (302) that implements a standard state machine steered by the TMS signal. In this regard, the TAP controller selects one of sixteen states for shifting data and instructions into the registers, among other functions. The instruction register (303) allows test instructions to be entered into each chip, and the instruction decoder (304) serves to decode the instructions. Extra "Status" data bits may defined by the user for inclusion in the instruction register, in addition to mandatory instruction bits. The output of a given register is selected by multiplexers 307 and 308, and driven off-chip by the output buffer (309), which supplies the TDO signal. The external signals applied to the JTAG test access port are provided by a master controller, also referred to as the "JTAG master" herein.

The JTAG standard allows a chip to have arbitrary data serially scanned into its boundary scan register (300), with each bit position corresponding to an input or output terminal of the chip. The data may then be applied as if it were test vector input to the chip or output from the chip. The JTAG standard also supports tri-stating outputs. A standard scheme allows opens and shorts on the board or bond wires to be located. A chip can be tested by applying its entire factory vector set in serially through the boundary scan register. The JTAG standard also allows for optional registers to be added. For example, a manufacturer's identification register (305) provides a unique code identifying the chip type. In addition, a user test register (306) may be defined, typically to provide support for triggering BIST and reading the test status results. However, a problem with the JTAG testing scheme as it has been developed to this point is that testing of a chip by serial scanning is very slow; hence functional testing cannot be performed at full chip speed.

SUMMARY OF THE INVENTION

We have invented a technique for testing an integrated circuit having a digital processor. The integrated circuit incorporates circuitry that allows for testing the digital processor at full operational speed. To perform the test, the only input/output signal pins required are those carrying the JTAG TAP signals, and optionally a system clock, allowing the integrated circuit to be mounted in a board during testing. Means for block downloading of a test program may optionally be included.

DETAILED DESCRIPTION

Figure 1:
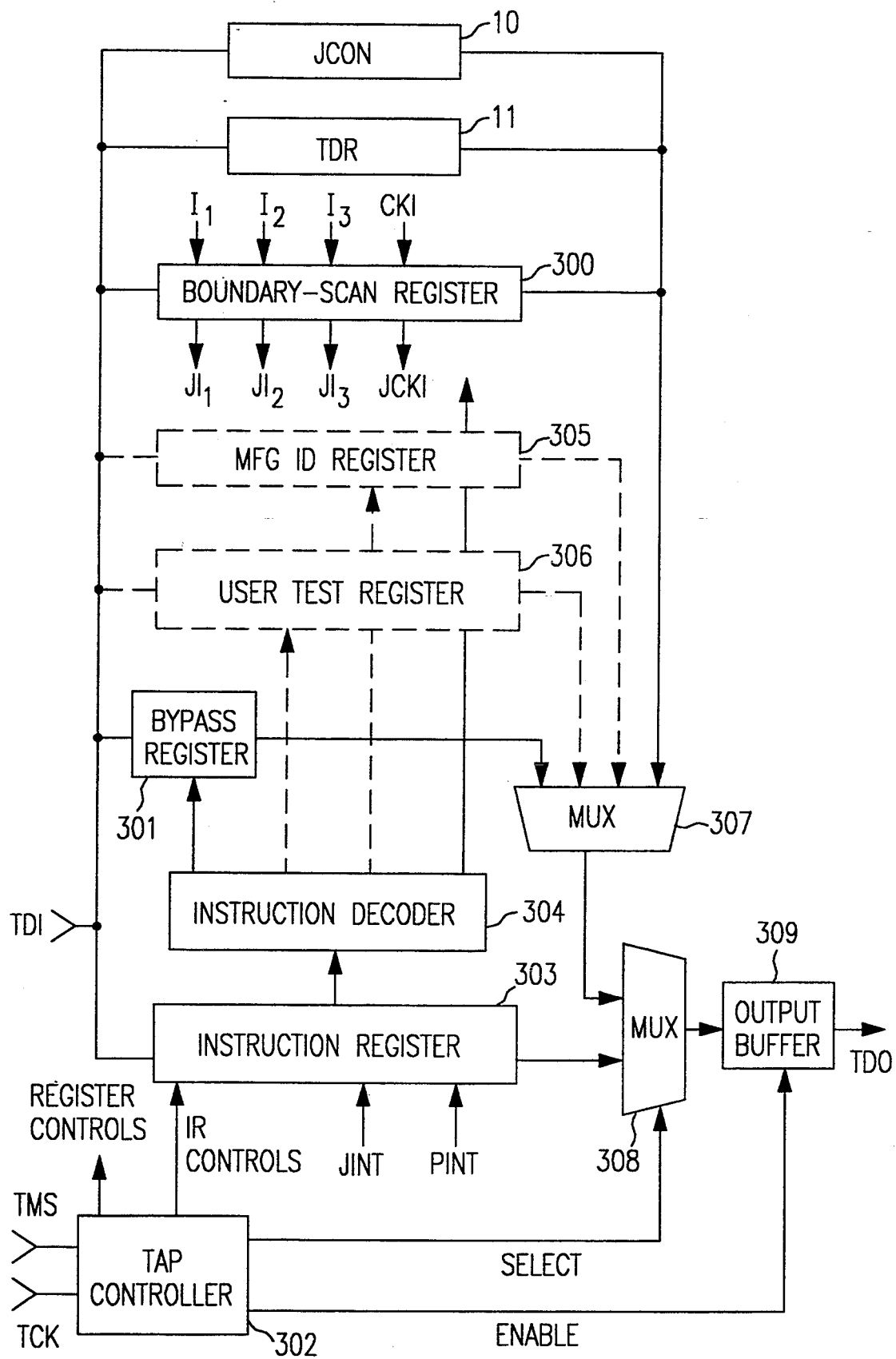
FIG. 1 shows an implementation of the present technique.

The following detailed description relates to an integrated circuit having a digital processor, and incorporating circuitry that allows for testing the digital processor at full speed. The digital processor is typically a digital signal processor (DSP) or microcomputer, wherein an arithmetic logic unit (ALU) resides on the same integrated circuit chip as the program memory. The integrated circuit may be mounted in a board during testing, and the only signal pins required are those carrying the JTAG TAP signals, with a high speed operational clock signal (i.e., the system clock) being optional. Two additional registers that are allowed under the "optional" clause of the JTAG standard have been defined, and are referred to as JCON and TDR herein. Both of these registers may be selected by sending the proper serial sequence to the TAP controller. Referring to FIG. 1, both JCON and TDR appear to the JTAG master as serial scan registers (10 and 11, respectively). JCON has parallel output on the chip. Six of its bits are used for the down-loadable self-test; they are:

| Signal | Function |
|---|---|
| JRESET | Reset digital processor core |
| BLOCKDL | Enable block downloading |
| JLOAD | Map JROM to program space for downloading |
| JPRLOW | Map program RAM starting at location 0 |
| SELCKI | Clock from bond pad instead of Boundary Scan register |
| CKTCK | Use TCK bond pad for clock instead of CKI |

The functions of these bits will be discussed below in some detail. The TDR (Test Data Register) is a serial shift register which is parallel readable and writable by the digital processor core. The number of bit locations in the TDR is typically equal to the width of the program memory, being 16 bits in the illustrative embodiment. To a program running on the digital processor core, the TDR appears as one of the registers in its potential set of sixty four registers. It may be written to or read from with any of the digital processor core's data move instructions.

The JTAG instruction register (IR) is decoded to allow operations on the various JTAG registers. In addition to implementing JTAG instructions which are standard, four instructions have been added in the illustrative embodiment for accessing JCON and TDR. They are:

| Instruction Mnemonic | Description |
|---|---|
| JCONW1 | Select JCON register for serial write |
| JCONR1 | Select JCON register for serial read |
| TDRW1 | Select TDR register for serial write |
| TDRR1 | Select TDR register for serial read |

The TDR provides a half duplex channel for passing words of information between the JTAG master and the digital processor core. As noted above, the words are 16 bits in the illustrative case, but could be any desired length that is suitable for use with the given digital processor core and its associated program memory. In order to facilitate communication, there are two status flags to signal that data has been written or read: JINT is set when the JTAG master writes a word and is reset when the digital processor core reads a word. PINT is set when JTAG master reads a word and is reset when the digital processor core writes a word. JINT is tied to an interrupt input and also a flag condition input of the digital processor core. PINT is tied to a flag condition input of the digital processor core. JINT and PINT are also tied to inputs in the JTAG instruction register block as indicated in FIG. 1. Hence, the JTAG master and the digital processor core can both sense when words have been written or read. Note that the flags JINT and PINT could alternatively be implemented using additional bits in the JCON register, if desired.

Figure 2:
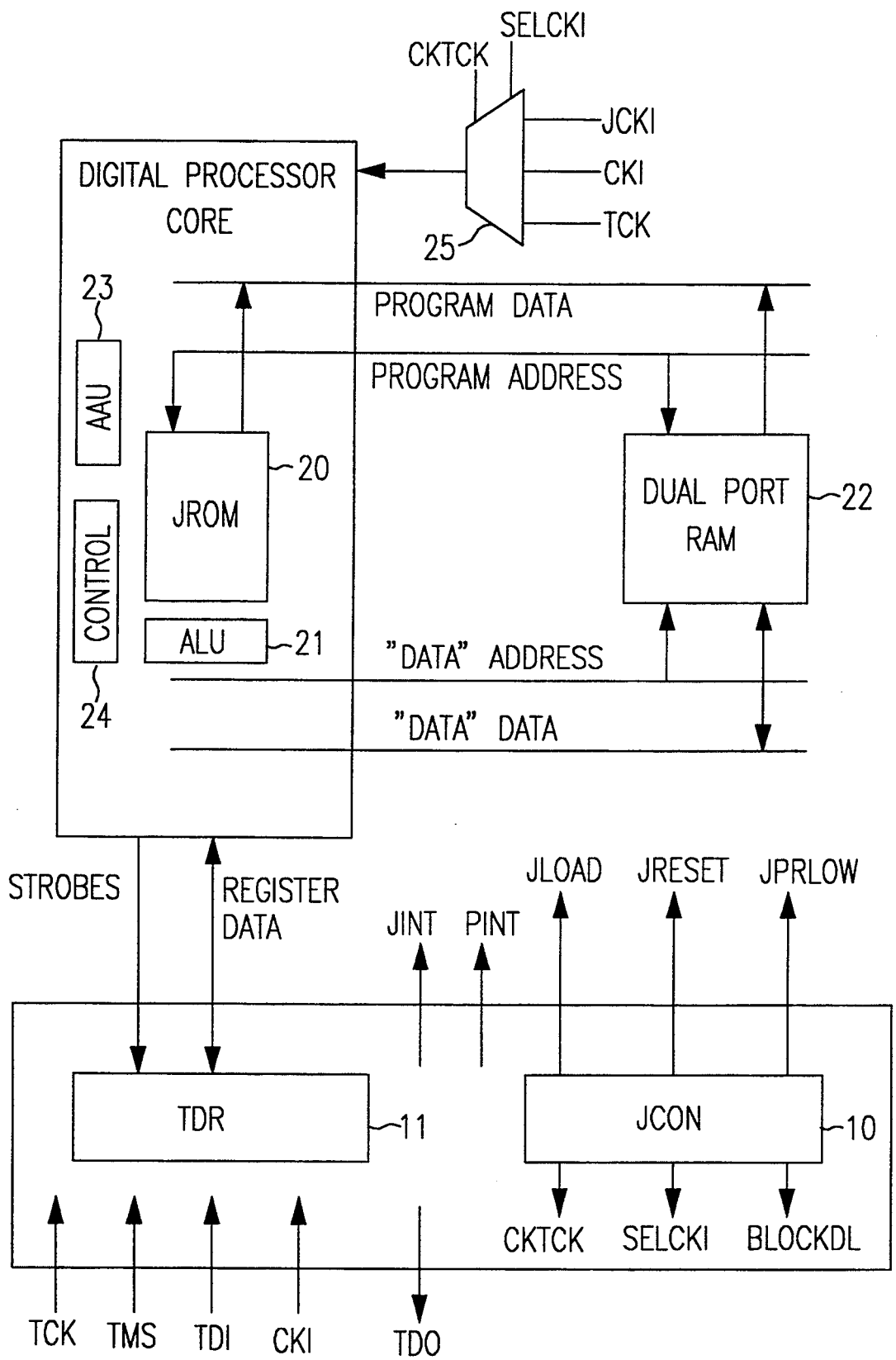
FIG. 2 shows control signals used in an illustrative embodiment of the invention.
Figure 3:
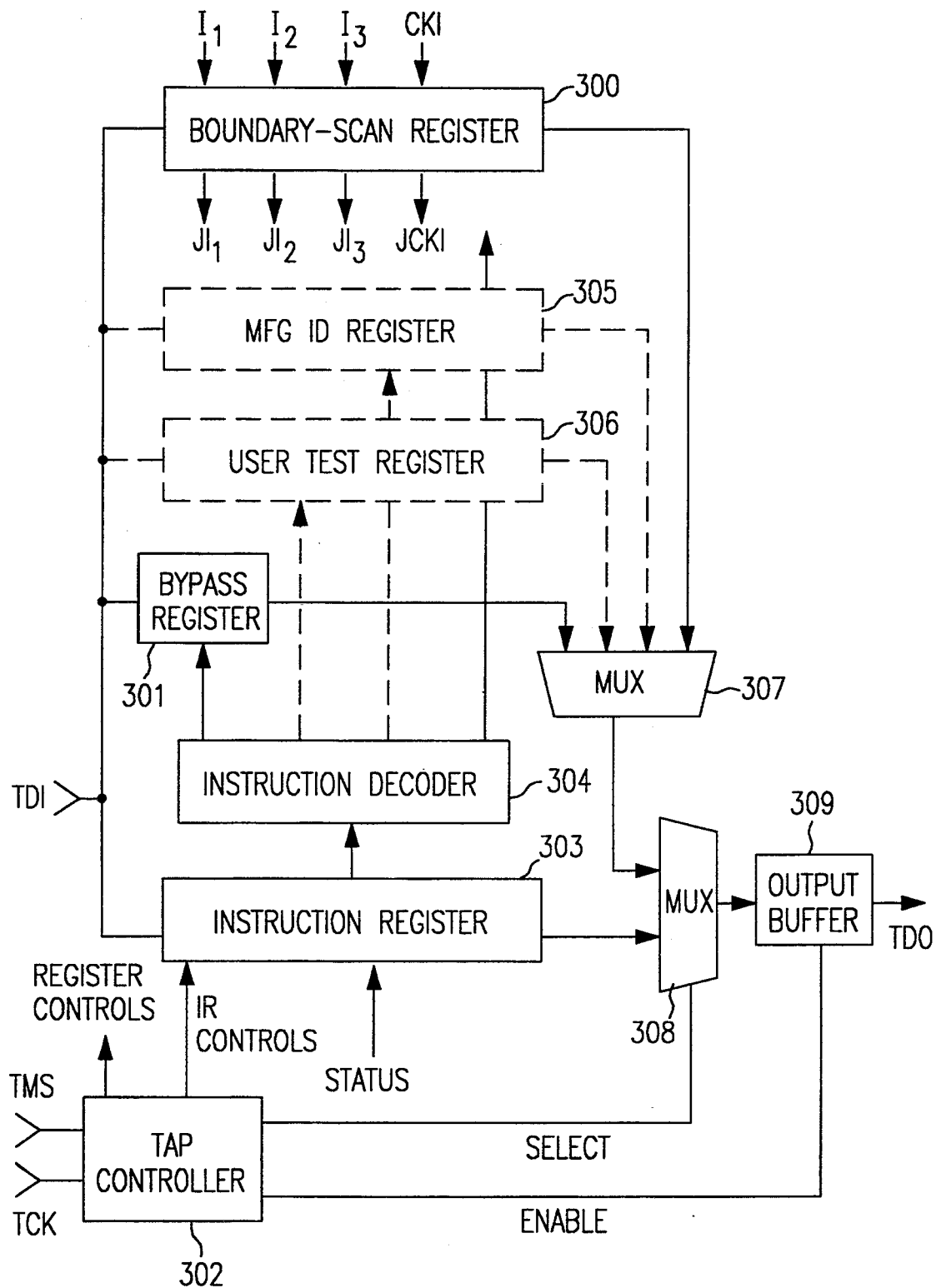
FIG. 3 shows the prior art JTAG technique.

Also included in the illustrative embodiment is a down-loadable digital processor architecture (see FIG. 2). The illustrative digital processor utilizes "harvard" architecture, which has separate address and data buses for "Instruction/Coefficient" and "Data". These buses communicate with the ALU (21), the arithmetic address unit AAU (23), and the controller (24). It also has dual port RAM (22) which communicates with both sets of buses. A program may be downloaded to the chip by having the digital processor core read an instruction as "Data" via one of its many data input mechanisms and writing it as "Data" to the dual port RAM. The instruction may then be executed from fetches over the "Instructions/Coefficient" buses from the dual port RAM. The scheme used in the illustrative processor uses a dual port memory associated with the digital processor core and having a size of typically at least 256 words. Note that unlike the BIST testing method, the memory requirement of the inventive testing technique does not necessarily add to chip area. This is because the memory may be re-used after testing for digital processor application programs and data. Although a dual-port memory is convenient for implementing the present invention, its use is not mandatory. For example, a Von Neumann architecture allows the use of a single-port memory. Note that the multiplexer 25, under control of signals CKTCK and SELCKI, provides a clock from any one of TCK (the JTAG test clock), CKI (the system clock used in normal chip operation), or JCKI (the scanned system clock).

A read-only memory "JROM" (20) resides in the digital processor core to control the downloading of test programs into the dual port RAM. This memory has six words in the illustrative case, and the assembly language program in the JROM is:

| | | |
|---|---|---|
| 0: | goto 4 | /* reset starts operation here */ |
| 2: | *r0++ = TDR | /* JINT interrupt goes to this location */ /* copy value from TDR to RAM location pointed to by r0 */ /* then increment pointer */ |
| 3: | ireturn | /* return from interrupt */ |
| 4: | set r0=0×0 | /* point to beginning of dual port RAM on "Data" port */ |
| 5: | ; | /* no operation (interruptible instruction) */ |
| 6: | goto 5 | /* loop waiting for JINT interrupt */ |

The JTAG master sequences downloading and execution using the control bits mentioned above in the JCON register. JTAG master sets the JLOAD signal. This causes the JROM to be mapped into the program space of the digital processor core. That is, JROM is enabled so that it responds to memory addresses in lieu of the program memory, in order to control the downloading of the test program into the program memory. Then JRESET is pulsed high and low. This resets the digital processor core and program execution begins at location 0 of the JROM. The digital processor core then sets a "Data" pointer to the beginning of dual port RAM and enters a two instruction loop at locations 5 and 6 of JROM. The JTAG master selects the TDR and shifts in a sixteen bit digital processor instruction. The JINT signal goes high to interrupt the program and it vectors to location 2. The instruction in the TDR is written into the dual port memory location pointed to, the pointer is incremented, and the JINT signal is cleared. The JTAG master can then either select the instruction register to poll for whether JINT has been cleared, or it may skip this step if it knows from timing considerations that the digital processor core has had enough time to read the TDR. The digital processor program returns from interrupt to its two instruction loop and the process repeats until the entire test program has been downloaded.

As thus described, the test program is transferred from the TDR to the program memory via the digital processor core. This allows the digital processor core to aid in controlling the transfer, and is an efficient use of hardware in many cases. However, the present invention does not depend on the exact method of performing this transfer. For example, the JROM could be omitted, and the TDR could directly connect to the program memory, and operate under the control of a direct memory access (DMA) controller. The JLOAD signal could then cause the DMA controller (not shown) to transfer the program word by word from the TDR to the program memory.

In order to execute the downloaded program, the JTAG master resets the JLOAD signal in JCON. This removes the JROM from the instruction space and maps the instruction port of the dual port RAM back in. The JTAG master sets the JPRLOW bit to select a program space memory map where the dual port RAM starts at location 0. It pulses the JRESET signal in JCON to reset the digital processor core, causing the downloaded test program to begin. Each test program produces results that are sent back to the JTAG master. The digital processor test program writes a result to the TDR. This clears the PINT signal. The JTAG master selects the instruction register and polls the PINT signal until it sees that a result has been written. The digital processor program does a conditional branch on the flag that is tied to PINT, looping until it sees PINT go high. When the JTAG master shifts out the result, PINT goes high and the digital processor program may write the next result. Before downloading a test, the JTAG master scans a desired condition into the Boundary Scan register. By using the JTAG Instruction Codes in the above table, the output and bidirectional pins of the chip will be held in the state of the Boundary Scan register during the test.

The JCON register optionally contains two additional signals to provide flexibility in clocking the digital processor test program while it is in a board environment. The board containing the digital processor normally provides a system clock to the CKI terminal. If this clock is available and free running on the board when the test is to be run, the JTAG master may select it as the source of chip clocking by setting the SELCKI signal in JCON, which allows the test to be run in situ at full speed. If the clock on the board is not running, it is still possible to clock the chip by two other methods. The default is the standard JTAG method, where the CKI may be scanned into the Boundary Scan register. This method is extremely slow. The other option is for the JTAG master to set the CKTCK signal in JCON. This causes the digital processor to be clocked by the JTAG test clock, TCK, supplied by the JTAG master. The speed of this clock is dependent on the system implementation.

Figure 4:
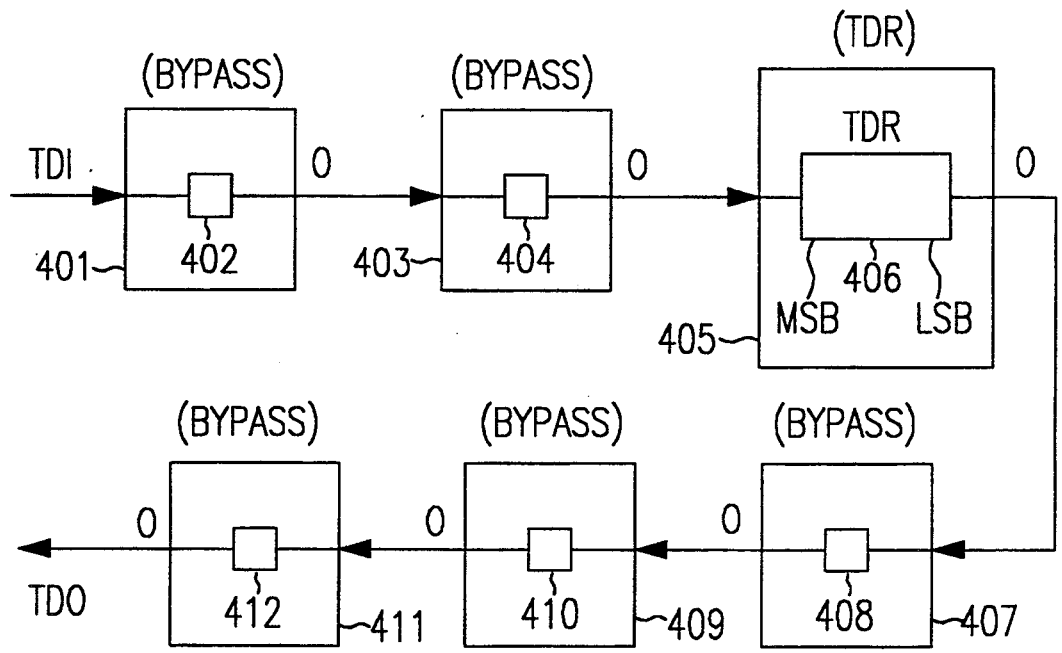
FIG. 4 shows a TDI-to-TDO daisy chain for use with block downloading.

In order to download the test program in the standard JTAG mode, it is necessary for the JTAG master to select the TDR and then scan in a sequence of data words. However, extra clock cycles are required before each n-bit data word in the standard JTAG mode, because every JTAG chip in the daisy chain that precedes the target chip is set for bypass. Each of the bypass registers in these preceding chips adds an extra bit. This is because the JTAG TAP controller finishes each scan cycle by a transition to the "Update-DR" state, which transfers data from the scan path to the JTAG output buffer. Therefore, an extra clock cycle of delay is required for every chip in the JTAG TDI-to-TDO daisy chain ahead of the chip to be tested according to the present invention. For example, referring to FIG. 4, a minimum of two extra clock cycles (one each for chips 401 and 403) are required to shift a word into the TDR (406) of the target chip (405). Therefore, a minimum of 18 bits (i.e., 18 clock cycles) are required to shift in each 16 bit data word in the illustrative case. In addition, the TAP controller requires at a minimum 5 additional state transitions per data scan operation. All of this leads to a large clock cycle overhead per word for downloading the test program.

Figure 5:
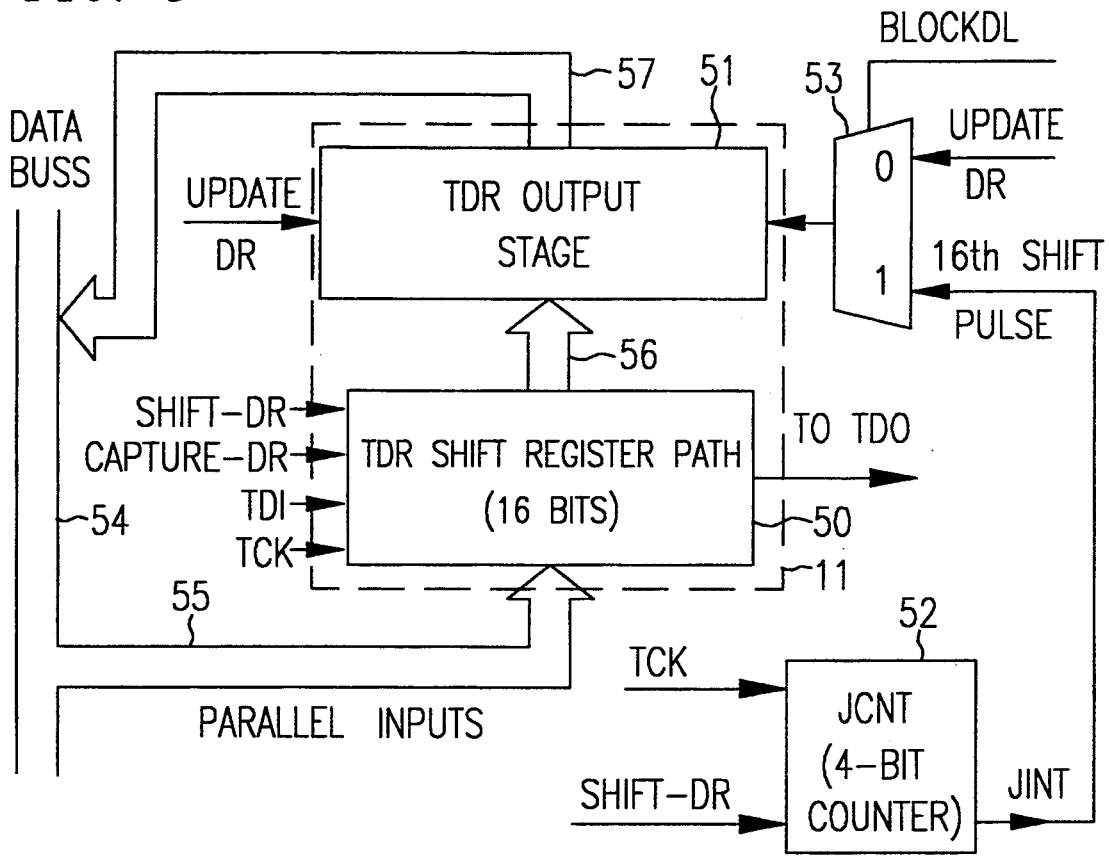
FIG. 5 shows control circuitry for use with block downloading.

However, in a preferred embodiment, the above-noted overheads are eliminated, by performing "block downloading". In this mode, the JTAG master scans in a "block" of test instructions, with a new word every sixteen bits (i.e., the word length) in the serial bit stream. Referring to FIG. 5, each time that a new word has been shifted into the TDR shift register (50), it is transferred to the TDR output stage (51) and latched, and JINT is set by the 4-bit counter (52). Then, the word is downloaded to processor core via the data bus 54, while the next sixteen bit word begins to shift in. This technique avoids the extra bits associated with the preceding chips in the TDI-to-TDO chain, as well as the extra state transitions of the TAP controller between data word transfers. Hence, block downloading considerably reduces the clock cycle overhead and speeds up downloading of a self test. The block downloading is selected in the illustrative embodiment when the JTAG master sets the BLOCKDL signal of JCON. BLOCKDL is applied to multiplexer 53, for selecting the output of the counter in lieu of the TAP controller update-DR signal. However, other means of activating block downloading are possible.

When the block downloading is initiated, there are still extra bits (one each for chips 401 and 403) that must be shifted into the target chip (405) before the first word of data in the block. The number of extra bits depends on the number of chips preceding the target chip. These initial bits should desirably be accounted for in such a way that the target digital processor may be in any position in the daisy chain. In a preferred embodiment, this is accomplished by initiating the block downloading as follows:

1) The JTAG master performs an instruction scan cycle which selects the TDR in the target chip and which selects the bypass register in every other chip in the TDI-to-TDO daisy chain.

2) The JTAG master sends an initializing bit sequence having a series of (n−1) "0's" followed by a dummy "1" start bit as the final bit of the sequence prior to sending the test program. In addition, an extra initial "0" is added by each preceding chip in bypass ahead of the target chip, since according to the JTAG standard, each bypass register (e.g., 402, 404) loads a "0" into the bypass shift register stage in the Capture-DR state. Therefore, the initial sequence seen by the target chip is 10000000000000000, which in time sequence is 17 zeros followed by a one, for the illustrative case of 16-bit words and two preceding chips.

Therefore, when the block transfer is initiated, circuitry on the target chip waits until the first "1" is received following the series of "0's", and then transfers the program words. Thus, the target chip may be located in any arbitrary position, without accounting for the chips preceding it. However, other initializing sequences are possible. For example, a "10" sequence may be used for the case of two preceding chips without the initial n "0's", but the controlling software become more complex. Alternatively, a counter accessible through JTAG could be loaded by the JTAG master with the number of register stages (either bypass or otherwise) that are ahead of the target chip. When the block transfer were initiated, the counter would count TCK clock cycles until the specified count was received, and then begin the block transfer.

Upon completion of the processing of the downloaded test program by the digital processor, the results are then uploaded to the TDR (50) from the data bus 54. This may be accomplished by directly writing the result to the TDR (a parallel bit transfer) by the digital processor, since the TDR is directly addressable therefrom. The result may then be serially scanned out via the JTAG output port TDO, according to the standard JTAG technique. In the illustrative arrangement of FIG. 4, the output passes through the bypass registers (408, 410, 412) of the chips (407, 409, 411) following the target chip. Note that the result of the test is typically several words, which require several such transfers. However, it is alternatively possible to compress the resulting words into fewer words, or even only one word, for transfer through the TDO port. Although an integrated circuit that implements the present invention may also implement all of the standard JTAG functions, that is not necessary in all cases. For example, the boundary-scan register may be omitted, while still advantageously implementing the present test using the TAP controller, instruction decoder, and TDI, TDO, TMS, and TCK pins on the integrated circuit. The prior-art use of user test registers (306) for implementing BIST may also be included in IC's that implement the present invention. Still other variations are possible, and included herein.

We claim:

1. An integrated circuit having input/output ports and comprising a programmable digital processor connected to a program memory having an address space; and further comprising means for performing boundary-scan testing on the input/output ports of said integrated circuit, wherein said means comprises a finite state machine controller connected to an instruction register that is connected to an instruction decoder, a serial test input port, and a serial test output port coupled to said instruction register; wherein said integrated circuit further comprises:

a test data register (TDR) connected to said finite state machine controller and said instruction decoder, and having n-bit locations for serially receiving a test program through said serial test input port, and for transferring said test program in parallel n-bit words into said program memory via said digital processor;

and a test control register (JCON) connected to said finite state machine and said instruction decoder for initiating downloading and execution of said test program in order to produce test results;

and wherein the test results of said test program are transferred via said programmable digital processor into said test data register for serial transfer through said serial test output port.

2. The integrated circuit of claim 1 wherein said program memory is a dual-port memory having a first port that is accessed by a data bus, and a second port that is accessed by a program instruction bus.

3. The integrated circuit of claim 1 wherein said test control register includes a control bit for clocking said programmable digital processor from a system clock signal supplied from a source external to said integrated circuit in lieu of a clock supplied from said means for performing boundary scan testing.

4. The integrated circuit of claim 1 wherein said test control register includes a control bit for clocking said digital processor from a signal supplied from a test clock external to said integrated circuit in lieu of a clock supplied from said means for performing boundary scan testing.

5. The integrated circuit of claim 1 wherein said test control register includes a control bit for resetting the programmable digital processor to an initial state.

6. The integrated circuit of claim 1 further comprising a read only memory, and wherein said test control register includes a control bit for mapping said read only memory into the address space of said program memory, wherein said read only memory controls downloading said test program into said program memory.

7. The integrated circuit of claim 1 wherein said instruction register includes instructions for: (1) selecting said test control register for a serial write operation; (2) selecting said test control register for a serial read operation; (3) selecting said test data register for a serial write operation; and (4) selecting said test data register for a serial read operation.

8. The integrated circuit of claim 1 wherein said test control register includes a control bit for enabling block downloading of said test program into said test data register, wherein said test program is received as a continuous sequence of data words after receiving an initial sequence of a given bit pattern.

9. The integrated circuit of claim 8 wherein said given bit pattern that is sent is a final "1" preceded by (n−1) zeros.

10. The integrated circuit of claim 1 further comprising:
 a first status flag means (JINT) connected to said programmable digital processor that is set when said means for performing boundary-scan testing writes a word, and is reset when said programmable digital processor reads a word; and
 a second status flag means (PINT) connected to said programmable digital processor that is set when said means for performing boundary-scan testing reads a word, and is reset when said programmable digital processor writes a word.

11. The integrated circuit of claim 10 wherein said first status flag means (JINT) and said second status flag means (PINT) are also connected to said instruction register.

12. The integrated circuit of claim 10 wherein said first status flag means (JINT) and said second status flag means (PINT) are implemented by means of register bits in said test control register (JCON).

13. An electronic system comprising a multiplicity of integrated circuits that implement a boundary-scan test according to a Joint Test Action Group (JTAG) boundary-scan test standard, wherein a given integrated circuit comprises a programmable digital processor connected to a program memory having an address space;
 and wherein said given integrated circuit further comprises:
 a test data register (TDR) controlled by a JTAG Test Access Port (TAP) controller and a JTAG instruction decoder, and having n-bit locations for serially receiving a test program through a Test Data Input (TDI) serial test input port, and for transferring said test program in parallel n-bit words into said program memory via said programmable digital processor;
 and a test control register (JCON) controlled by said TAP controller and said JTAG instruction decoder for initiating downloading and execution of said test program in order to produce test results;
 and wherein the test results of said test program are transferred via said programmable digital processor into said test data register for serial transfer through a Test Data Output (TDO) serial test output port.

14. The system of claim 13 wherein said program memory is a dual-port memory having a first port that is accessed by a data bus, and a second port that is accessed by a program instruction bus.

15. The system of claim 13 wherein said test control register includes a control bit for clocking said programmable digital processor from a signal supplied from a source external to said given integrated circuit in lieu of a clock supplied from said given integrated circuit.

16. The system of claim 13 wherein said test control register includes a control bit (JRESET) for resetting the programmable digital processor and beginning test program execution at a given memory location.

17. The system of claim 13 further comprising a read only memory, and wherein said test control register includes a control bit for mapping said read only memory into the address space of said program memory, wherein said read only memory controls the downloading of said test program into said program memory.

18. The system of claim 13 wherein said instruction register includes instructions for: (1) selecting said test control register for a serial write operation; (2) selecting said test control register for a serial read operation; (3) selecting said test data register for a serial write operation; and (4) selecting said test data register for a serial read operation.

19. The system of claim 13 wherein said test control register includes a control bit for enabling block downloading of said test program into said test data register, wherein said test program is sent as a continuous sequence of data words after an initial sequence of a given bit pattern.

20. The system of claim 13 wherein said given bit pattern that is sent is a final "1" preceded by (n−1) zeros.

21. An integrated circuit comprising a programmable digital processor connected to a program memory;
 and further comprising a finite state machine controller connected to an instruction register that is connected to an instruction decoder, a serial test input port and a serial test output port coupled to said instruction register;
 wherein said integrated circuit further comprises:
 a test data register (TDR) connected to said finite state machine controller and said instruction decoder, and having n-bit locations for serially receiving a test program through said serial test input port, and for transferring said test program in parallel n-bit words into said program memory;
 and a test control register (JCON) controlled by said finite state machine controller and said instruction decoder for initiating downloading and execution of said test program in order to produce test results;
 and wherein said programmable digital processor uploads the test results of said test program into said test data register for serial transfer through said serial test output port,
 and further comprising means for enabling block downloading of said test program into said test data register, wherein said test program is received as a continuous sequence of data words after receiving an initial sequence of a given bit pattern, and wherein said given bit pattern that is received is a final "1" preceded by a series of all zeros.

22. The integrated circuit of claim 21 wherein said test program is transferred directly from said test data register into said program memory.

23. The integrated circuit of claim 21 wherein said test program is transferred from the test data register into said program memory via said programmable digital processor.

* * * * *